April 8, 1930. W. HOWELL ET AL 1,753,240
FLUID DISTRIBUTING APPARATUS
Filed Aug. 28, 1926  2 Sheets-Sheet 1
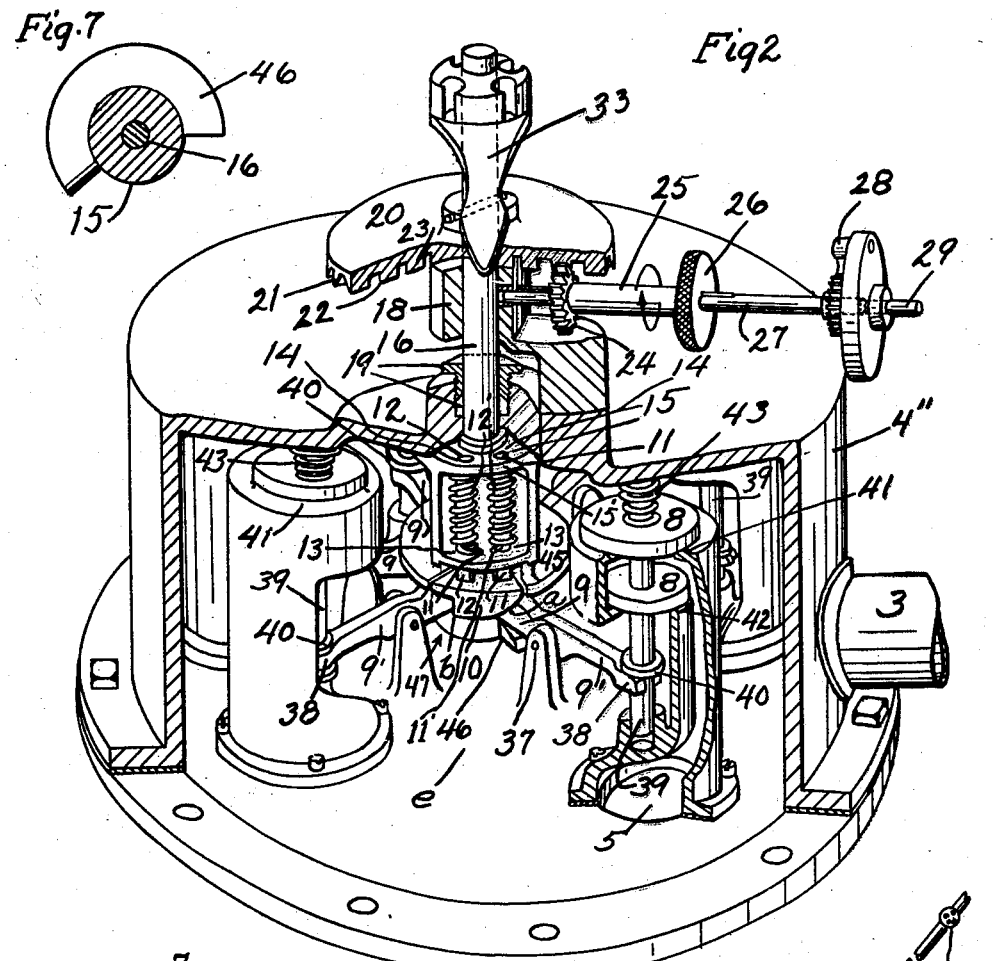
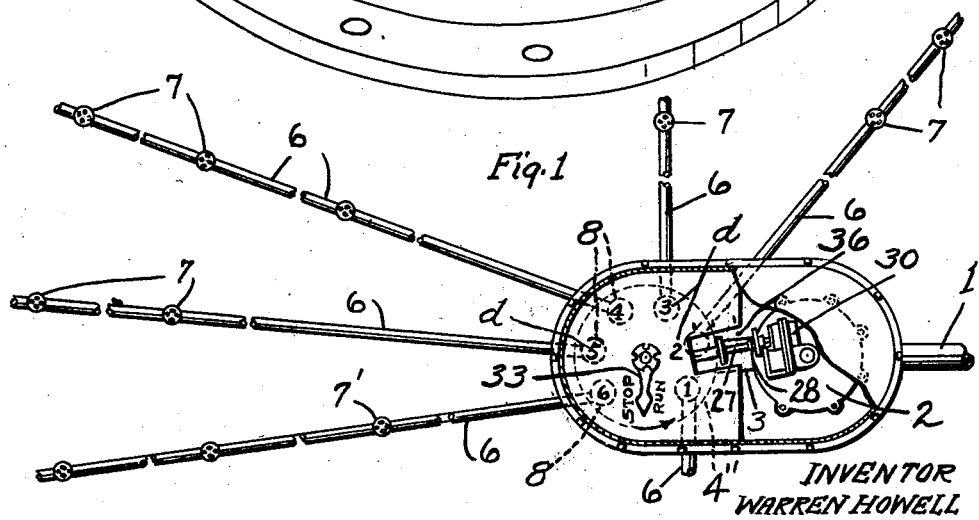
WITNESS
Robt. S. Woolsey
INVENTOR
WARREN HOWELL
GARDNER SHERBURNE
by James R. Townsend
Their Atty April 8, 1930.    W. HOWELL ET AL    1,753,240
FLUID DISTRIBUTING APPARATUS
Filed Aug. 28, 1926    2 Sheets-Sheet 2
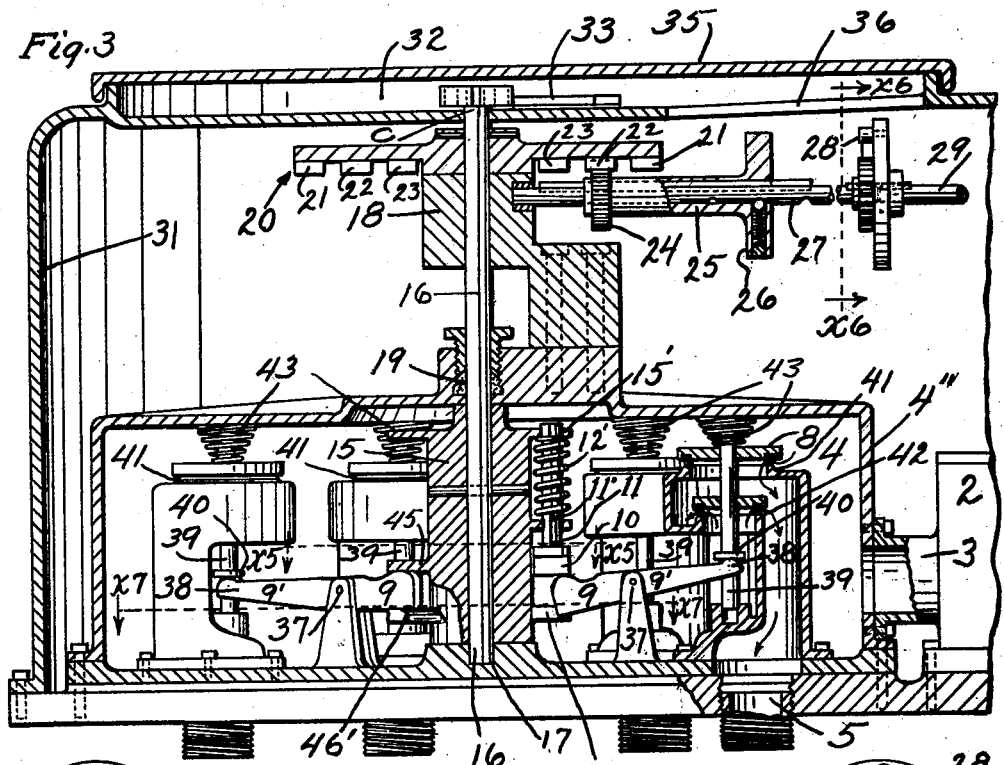
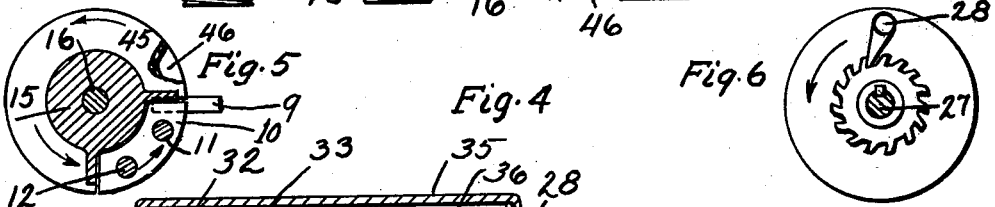
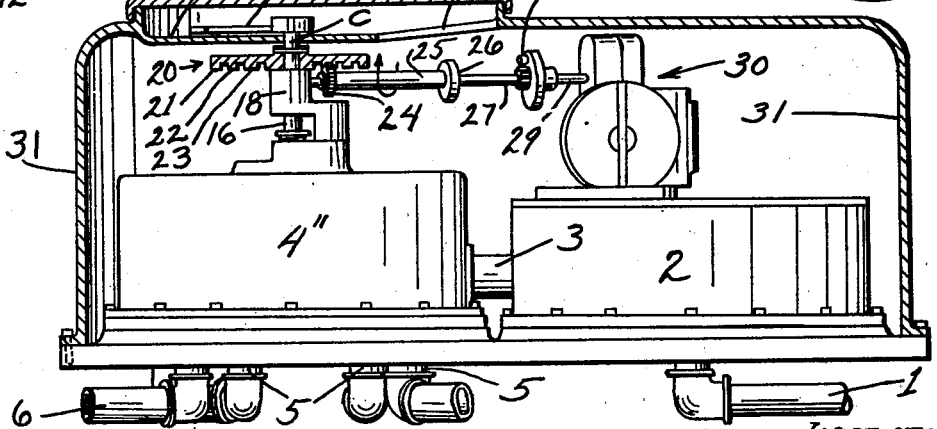
WITNESS
Robt. S. Woolsey
INVENTOR
WARREN HOWELL
GARDNER SHERBURNE
by James R. Townsend
his Atty Patented Apr. 8, 1930

1,753,240

UNITED STATES PATENT OFFICE

WARREN HOWELL AND GARDNER SHERBURNE, OF PASADENA, CALIFORNIA

FLUID-DISTRIBUTING APPARATUS

Application filed August 28, 1926. Serial No. 132,236.

An object of this invention is to provide simple, compact, automatic means to distribute to different locations, a predetermined amount of fluid flowing through and operating a single meter; and the invention comprises a chamber having outlets and connected to receive fluid from the meter; distributing valves arranged inside the chamber to close the outlets respectively; valve opening mechanism inside the chamber operable by and in predetermined relation to the meter and adapted and arranged to open and temporarily hold open the valves respectively in succession; and means for automatically closing and holding closed all of said valves, except a temporarily open valve during the open period of the valve temporarily held open by the valve opening mechanism.

The invention is more particularly intended to be applied to the operation of sprinkling systems for lawns, gardens and fields, and in carrying out the invention we have applied it in combination with a series of pipes leading respectively to different sets of sprinklers, so that when water is allowed to flow from the central chamber through one pipe, water will be delivered to the sprinklers of one section of the lawn or field to be watered, and so on, with each of the pipes.

An object of the invention is to make provision for uniformly watering an area by water supply means which is insufficient to apply the water properly at one time to the entire area; and we have made provision whereby the apparatus can be manually set to deliver the predetermined volume of water under sprinkler operating pressure from a predetermined supply, to each pipe and its set of sprinklers in regular succession, until the predetermined volume has been distributed and to cut off the flow when the last set of sprinklers has delivered its quota.

Provision is made whereby the apparatus can be set to deliver greater or less quantities of water during the open period of the valves respectively; that is to say, for example, the apparatus may be set to deliver 50 cubic feet of water to each sprinkler set of the system, and when the apparatus is so set, exactly that amount of water will be delivered to each set of sprinklers irrespective of the pressure at which the water is supplied to the main chamber, and to the sprinklers of the system; and, by resetting the apparatus, the amount of water delivered may be increased to 100 cubic feet more or less, for each set of sprinklers, or may be decreased to, say, 25 cubic feet or other predetermined amount for each delivery, per set of sprinklers.

An object of the invention is to make provision whereby the operation of the meter may be applied in a practical manner to cause the water to be automatically turned on and off from the various pipes in succession throughout a predetermined cycle.

An object is to minimize expense of manufacture, installation and operation, and a feature of the invention is that we have made provision whereby the operation and control of the distributing mechanism is effected automatically by power from the meter which is operated by the flow of the fluid measured thereby, to be delivered to the places to be successively supplied.

We do not limit the invention to specific forms of the various elements employed, and may, for example, use balanced valves or spring-pressed valves as occasion may render most convenient or desirable.

The invention will be shown herein as employing spring pressed balanced valves.

The invention includes the combination, and various parts and combinations of parts; and may be applied in part to supply to a single outlet, a predetermined amount of fluid, and to then automatically stop and remain inactive until manually set into operation.

A feature of this invention is in the measuring of a volume of water by a meter, and in utilizing energy from the meter, created by the flow of the measured volume, to operate means for apportioning the measured volume to a plurality of outlets.

Other objects, advantages and features of the invention may appear from the accompanying drawings, the subjoined detailed description and the appended claims.

The accompanying drawings illustrate the invention.

Figure 1 is a fragmental plan of apparatus constructed in accordance with this invention, including in diagrammatic form, a plurality of sets of sprinklers in reduced scale; parts of the lid and the housing are broken away to expose interior mechanism.

Fig. 2 is a fragmental perspective view partly in section, of the distributing apparatus in rest position; the dial plate and shell or housing are omitted.

Fig. 3 is an elevation partly in axial section, of the distributing mechanism in operation. The circular lid and fragments of the housing and meter are also shown.

Fig. 4 is an elevation of the apparatus, the housing and lid being shown in vertical midsection.

Fig. 5 is a plan section on line $x^5$, Fig. 3 of the hub, and shows the shoe running onto a valve-opening lever just as the lever supporting flange is passing from below the lever so that the shoe may operate the lever with snap action force of the shoe depressing means.

Fig. 6 is a diagrammatic face view of the ratchet connection.

Fig. 7 is a plan view in section on line $x^7$, Fig. 3, showing the flange that supports the inner end of each valve lever while the shoe is running onto such lever, thereby compressing the shoe depressing spring means so that when the flange escapes from beneath the lever shown in Fig. 5, the spring means will force the shoe down to operate the valve opening lever with snap action.

The distributer is shown at rest in Figs. 1 and 2; in Fig. 3 it is shown as opening the first valve, and in Fig. 4 it is shown as opening the fifth valve.

The supply pipe 1 is led from a suitable source, not shown, to the meter 2 which may be of any practical character adapted to measure the fluid that is to be distributed. 3 is the connection between the meter and a chamber 4, that is formed in a shell 4″ and is adapted to hold said fluid under the working pressure with ample coefficient of safety, and that is provided with outlets 5 leading to pipes 6, through which the fluid is to be distributed to nozzles 7, that in the case of delivering water to lawns, will be lawn sprinklers of any approved character.

Each of the outlets 5 is shown provided with a spring-pressed normally closed balanced valve 8, that is opened by a lever 9, of the first class which is adapted to be operated by a runner or shoe 10, the bottom of which has an upwardly aslant portion at the front end as at $a$ and terminates abruptly at the rear end as at $b$; and said front and rear ends are fixed to spring depressed vertical rods 11 and 12 that are mounted in vertical ways 13 and 14, respectively, in a hub 15, which is fixed to a shaft 16 mounted in bearings 17 and 18 and passing through a stuffing box 19 in the shell of the chamber 4. 20 is a gear wheel shown with concentric annular gears 21, 22 and 23 which are adapted to mesh with the pinion 24 that is fixed to a slide 25 provided with a thumb piece 26, and slidably and non-rotatably mounted on a spindle 27 that is connected by an over-run pawl and ratchet connection 28 with the shaft 29 operated by the gear train 30 driven by the meter 2.

The mechanism is shown inclosed in a shell or housing 31 having a dial plate 32 over which a hand or pointer 33 is revolved by the shaft 16, to the reduced upper end $c$ of which shaft, the pointer 33 is fixed. Said dial is provided with a predetermined set of numerals $d$ that designate the respective distributing pipes 6 and delivering sets of nozzles 7.

The ratchet 28 allows the hand 33 to be manually turned in the same direction as the hand is turned by the meter, so that an attendant may move the hand around to any position required, to bring the shoe 10 into position to open a desired valve; the attendant being able to determine which set of delivery devices is opened, by noticing the character $d$ over which the hand extends. The top of the housing 31 is provided with a lid 35 that may be removed to give access to the hand 33; and a portion of the housing under the lid is provided with a slot 36 through which the attendant may gain access to the thumb piece 26 for the purpose of sliding the slide 25 to cause the pinion 24 to mesh with a desired toothed annulus so that when it is desired to increase or diminish the volume of fluid to be delivered at any one period of an open valve, the attendant may make such change by taking off the lid and manipulating the thumb piece 26, to shift the pinion from one to another of the annular gears.

The rods 11 and 12 are provided with spring purchases in the form of pins 11′ to receive the pressure of shoe depressing springs 12′ the upper ends of which abut against the flange 15′ of the hub 15, so that the shoe is normally held down.

46 is a segmental lever-support projecting from the hub 15 underneath the slanting or rounded front $a$ of the shoe, and the upper surface of the support 46 is just below the level of the under surfaces of the inner ends of the levers 9 when the valves are closed by their springs 43, and the front end 46′ of such support 46 is slanting and passes under the levers as the hub 15 and shoe revolve. The front rounded portion $a$ of the shoe overhangs the rear end of the shoe support and contacts with the upper side of the inner end of a lever, supported by the support, and as the hub revolves, the shoe will ride up into position over such inner end of the lever thus compressing the valve opening springs 12′ while such inner end of the lever is supported by the support; and before such inner end can be depressed, the hub and shoe must be moved by meter operation or by the pointer 33 until the support is withdrawn from beneath the lever and the shoe is advanced onto the lever.

The shoe depressing spring means 12', are stronger than the valve closing means 43, and depresses the inner end of the lever the instant the lever support moves from beneath the lever 46, and the valve therefore opens with a snap action and remains open until the shoe passes from the lever.

The dial plate is laid off in a predetermined number of sections, greater by one than the number of the valves 8 for the distributing pipes 6 and the operative face of the shoe 10 is slightly longer than the space between any two successive levers, and the length of the operative face of the shoe is such that the rear valve is held open momentarily after the front valve has been opened, thus to avoid water hammer and to allow constant operation of the meter so that the same will revolve the shoe continuously from the time the first valve is open until the last valve is closed.

The rear end of the shoe terminates abruptly so that it leaves the previously depressed end of lever 9 instantly and the arrangement is such that the valve from the lever of which the shoe escapes, is closed with a snap action by valve spring 43, but not until a moment after the forward valve is opened, thus preventing stoppage of flow at any time, until the shoe passes from the last lever, and also preventing dribbling.

There may be any number of valves and pipes; the valve levers being equally spaced, except that the space e between the first and last valve levers of the series is sufficiently great to allow the shoe to escape from the last lever of the series before it reaches the first lever of the series so that at the moment the shoe has completed the round of valve levers, all of the valves will be closed and the flow through the meter will be stopped, and consequently the apparatus comes to rest.

In this manner the cycle of a single operation includes only the operation once of each of the valves; and in order to start the flow, it becomes necessary to manually revolve the shoe operating shaft and to thus cause the shoe to depress the first lever so as to open the first valve, thus starting the apparatus on a cycle of automatic operation.

The valve operating levers are fulcrumed at 37, and the valve operating end 9' of each is shown terminating in a fork 38 embracing a valve stem 39 and acting upon a collar 40 thereon to lift the valve from its seats 41, 42 to which it is returned by spring 43 when the shoe has passed the inner end of the lever 9 and left such lever free.

The spring and lever arrangement is such that when the shoe is on any lever, the valve opening force exceeds the force required to close two valves so that the shoe will hold two valves open when the shoe is on their levers and both such levers are free to respond to its pressure.

It is thus seen that we have provided an automatic volumetric distributer which involves no expense for power in its operation and which utilizes the power of the flow of fluid for the purpose of controlling the distribution; and by which large areas of land may be sprinkled with but little attention of the caretaker, and that the predetermined amount of fluid is delivered at each time irrespective of the pressure or the speed of flow.

We claim:—

1. The combination with a meter, of a chamber connected to receive fluid passing through the meter, and provided with a series of outlets to discharge such fluid from the chamber; valves for said outlets respectively; means to yieldingly hold the valves closed; valve opening means operated by the meter and adapted to open the valves successively, and to hold one valve open while reaching position to open a succeeding valve; and snap action means to open the succeeding valve just before the valve opening means leaves the preceding valve free to be automatically closed.

2. The volumetric distributor set forth comprising a chamber provided with outlets; valves normally closing the outlets; levers adapted to open the valves respectively; a runner adapted to move the levers successively to valve opening position and to hold them in such position during a predetermined movement of the runner; spring means adapted to operate the runner to open the valves; means to move the runner from lever to lever; and a stop movable with the runner and adapted and arranged to hold the runner from causing the valve to open until the runner is in position to operate the valve opening means with snap action, and to then release the runner so it may thus operate to open the valve.

3. The combination with a normally closed valve, of means to open the valve; a stop to temporarily hold the valve opening means from being operated; a yielding runner adapted to ride onto the valve opening means while the same is held inoperative; means for moving the stop to position where the support will release the valve operating means and the runner into position to operate the valve opening means, so that the valve is opened by snap action.

4. The combination with a meter, of a shaft operable by the meter, a pinion shaft, a pinion on the pinion shaft, an over-run ratchet connecting the pinion shaft to the meter operated shaft, a crown gear driven by the pinion, a shaft fixed to the crown gear and provided with a pointer, a lever support fixed to and revolvable with the shaft, a lever adapted to be temporarily supported by the support, a runner revovable with the shaft and support and adapted to ride onto the lever while the same is supported by the support, valve opening spring means which are put under tension by the runner as it rides over the lever, and adapted to operate the lever with snap action when the support passes from underneath the lever, and a normally closed valve adapted to be opened by the lever when depressed.

5. The combination with a chamber having a plurality of outlets, of valves for the outlets from said chamber, means normally closing the valves, a fluid meter discharging into said chamber and mechanism operable by, and in predetermined relation to, the meter to open the valves singly and in succession.

6. A water distributing apparatus comprising a meter, outlets in communication with the meter, a valve for each outlet, a valve operating device movable by the meter and including in its path of travel a plurality of said valves whereby a measured volume of liquid passing through the meter will be apportioned through a plurality of the outlets, and means for selectively setting said valve operating device with respect to said valves.

7. A water distributing apparatus comprising a meter, outlets in communication with the meter, a valve for each outlet, a valve operating device movable by the meter and including in its path of travel a plurality of said valves whereby a measured volume of liquid passing through the meter will be apportioned through a plurality of the outlets, and a variable ratio gear driving means for varying the speed of the movement of said valve operating device relative to the speed of the meter.

8. The combination with a chamber having an outlet and a meter connected to deliver fluid under pressure to the chamber, and operable by fluid passing from the meter into the chamber; of a valve inside the chamber to open and close the outlet; automatic means inside the chamber for moving the valve into and normally holding it in closed position; revolvable means arranged inside the chamber to open the valve and to hold it open, and adapted to move the valve opening means to inoperable position when a predetermined volume of fluid has passed through the meter, and arranged to allow the automatic valve closing means to close the valve when said predetermined volume has passed through the meter.

In testimony whereof, we have hereunto set our hands at Los Angeles, California, this 10th day of August, 1926.

WARREN HOWELL.
GARDNER SHERBURNE.